United States Patent
Lorang et al.

(10) Patent No.: US 8,732,317 B2
(45) Date of Patent: May 20, 2014

(54) SYSTEM AND METHOD FOR CONNECTING A MOBILE DEVICE TO A GLOBAL NETWORK USING A VIRTUAL PRIVATE NETWORK CONNECTION

(71) Applicant: MetroPCS Wireless, Inc., Richardson, TX (US)

(72) Inventors: Malcolm Lorang, Dallas, TX (US); Dimitrios Douros, Plano, TX (US); Solyman Ashrafi, Plano, TX (US); Karah Schmitz, Lantana, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

(21) Appl. No.: 13/875,374

(22) Filed: May 2, 2013

(65) Prior Publication Data
US 2014/0025819 A1    Jan. 23, 2014

Related U.S. Application Data

(63) Continuation-in-part of application No. 13/551,214, filed on Jul. 17, 2012.

(51) Int. Cl.
    *G06F 15/16*    (2006.01)
(52) U.S. Cl.
    USPC ............................. 709/227; 455/466; 709/225

(58) Field of Classification Search
    USPC .............. 726/12, 15; 709/246, 220, 225, 227; 370/218, 328; 455/466
    See application file for complete search history.

(56) References Cited

U.S. PATENT DOCUMENTS

| 2007/0180147 A1* | 8/2007 | Leigh ............................. 709/246 |
| 2011/0154477 A1* | 6/2011 | Parla et al. ........................ 726/15 |
| 2012/0023570 A1* | 1/2012 | Gorodyansky ................... 726/12 |
| 2012/0134257 A1* | 5/2012 | Knox .............................. 370/218 |
| 2013/0201909 A1* | 8/2013 | Bosch et al. ................... 370/328 |

* cited by examiner

Primary Examiner — Jungwon Chang
(74) Attorney, Agent, or Firm — Howison & Arnott, L.L.P.

(57) ABSTRACT

A virtual private network connection is established from a mobile device to a virtual private network server of a service provider associated with a mobile device responsive to a request for access to the remotely located content provider. A second connection is established, under control of the virtual private network server, from the virtual private network server of the service provider to the remotely located content provider server. A third connection is established, under control of the virtual private network server, from the virtual private network server of the service provider to an advertising server. The virtual private network connection, the second connection and the third connection are maintained under the control of the virtual private network server to enable transport of content data between the mobile device and the remotely located content provider server and to enable transport of advertising data between the mobile device and the advertising server.

19 Claims, 6 Drawing Sheets

SYSTEM AND METHOD FOR CONNECTING A MOBILE DEVICE TO A GLOBAL NETWORK USING A VIRTUAL PRIVATE NETWORK CONNECTION

CROSS-REFERENCE TO RELATED APPLICATIONS

This application is a continuation-in-part of U.S. patent application Ser. No. 13/551,214, filed Jul. 17, 2012, entitled SYSTEM AND METHOD FOR CONNECTING A MOBILE DEVICE TO A GLOBAL NETWORK USING A VIRTUAL PRIVATE NETWORK CONNECTION, the specification of which is incorporated herein in its entirety.

TECHNICAL FIELD

The present invention relates to the connection of a mobile device to a global network, such as the Internet, and more particularly, to connecting a mobile device to a global network, such as the Internet, using a virtual private network associated with the service provider network of the mobile device.

BACKGROUND

A mobile device such as a Smartphone, tablet, PDA, pager, or any other mobile device having a wireless or wireline interface has the ability to access one or more networks through the device. These can include networks such as a 4G/LTE network, CDMA network, GSM network, Wi-Fi network, BT network, USB network or NF com network. Depending upon the location of the mobile device, only some or none of these networks may be available to connect with the mobile device and varying types of charges may apply to the user of the mobile device, depending upon the agreements between the home network service provider of the mobile device and the available networks. When the mobile device leaves one network and enters a different network, there is a loss of connectivity and an interruption in the transmission of data, voice, or other services to the user depending upon the network, mobile interface availability and commercial agreements with the mobile device and the subscribing networks. National and international agreements between end users of the mobile device and operators providing the network services can impact the ability to connect to a network even when the network is available.

Within existing mobile devices, the mobile device will include a number of network interfaces enabling connections to, for example, an LTE network, a Wi-Fi network or a BT network. The mobile device is able to check each of these connections and determine which one it would like to utilize to establish a connection over the Internet. If the user establishes a connection through, for example, a Wi-Fi network, the Wi-Fi network will provide a connection to the mobile device and then to any content server that may be accessed via the Internet. The connection is provided by the Wi-Fi network directly between the mobile device and the content server over the Internet and the network services of the normal service provider of the mobile device are not required.

When a mobile device is attempting to connect to a network, the mobile device must determine available networks from a predefined priority list that is stored within the mobile device and must determine the signal strengths of the available networks. In accordance with the predefined priority list and the signal strength of the available networks, the mobile device may either present the user with the available options for network connection or automatically connect the mobile device with a network. Depending upon the network that the mobile device is connected with, the mobile device may have access to different levels of resources and content based upon the network authentication mechanism and the credentials of the user of the mobile device.

When a network to which the mobile device is connected is no longer available, the active call and data sessions from the mobile device are dropped. This can cause an undesirable user experience. Roaming agreements between system operators can allow the user of a mobile device to access network resources between different locations where a user's normal network may not be available but this can have significant financial obligations for the mobile device user when using a non-standard network. Free networks are available that may grant a mobile device access to the Internet. An example of this is a Wi-Fi network. A mobile device can connect with or without cost to the end user using one or more types of Wi-Fi networks.

One problem that may arise within the network outside of the operator's coverage area involves the active voice and data calls being interrupted and requiring re-initiation. Additionally, some type of networks may or may not support voice functionality or operator-specific content access and may not have the desired operator-provided optimized user experience on the mobile device that a user expects. Additionally, there may be an increased risk of identity theft, fraud and security risk in transmitting or receiving information within a non-trusted network. Thus, it would be desirable to provide some type of manner for limiting call interruptions and providing secure and seamless user experiences both inside and outside of the operator's network even when roaming agreements are not present or used by a specific user.

SUMMARY

The present invention, as disclosed and described herein, in one aspect thereof, comprises a system and method for providing access between a remotely located content provider server and a mobile device. A virtual private network connection is established from the mobile device to a virtual private network server of a service provider associated with the mobile device responsive to a request for access to the remotely located content provider. A second connection is established, under control of the virtual private network server, from the virtual private network server of the service provider to the remotely located content provider server. A third connection is established, under control of the virtual private network server, from the virtual private network server of the service provider to an advertising server. The virtual private network connection, the second connection and the third connection are maintained under the control of the virtual private network server to enable transport of content data between the mobile device and the remotely located content provider server and to enable transport of advertising data between the mobile device and the advertising server.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a system and method for connecting a mobile device to a global network using a virtual private network connection are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
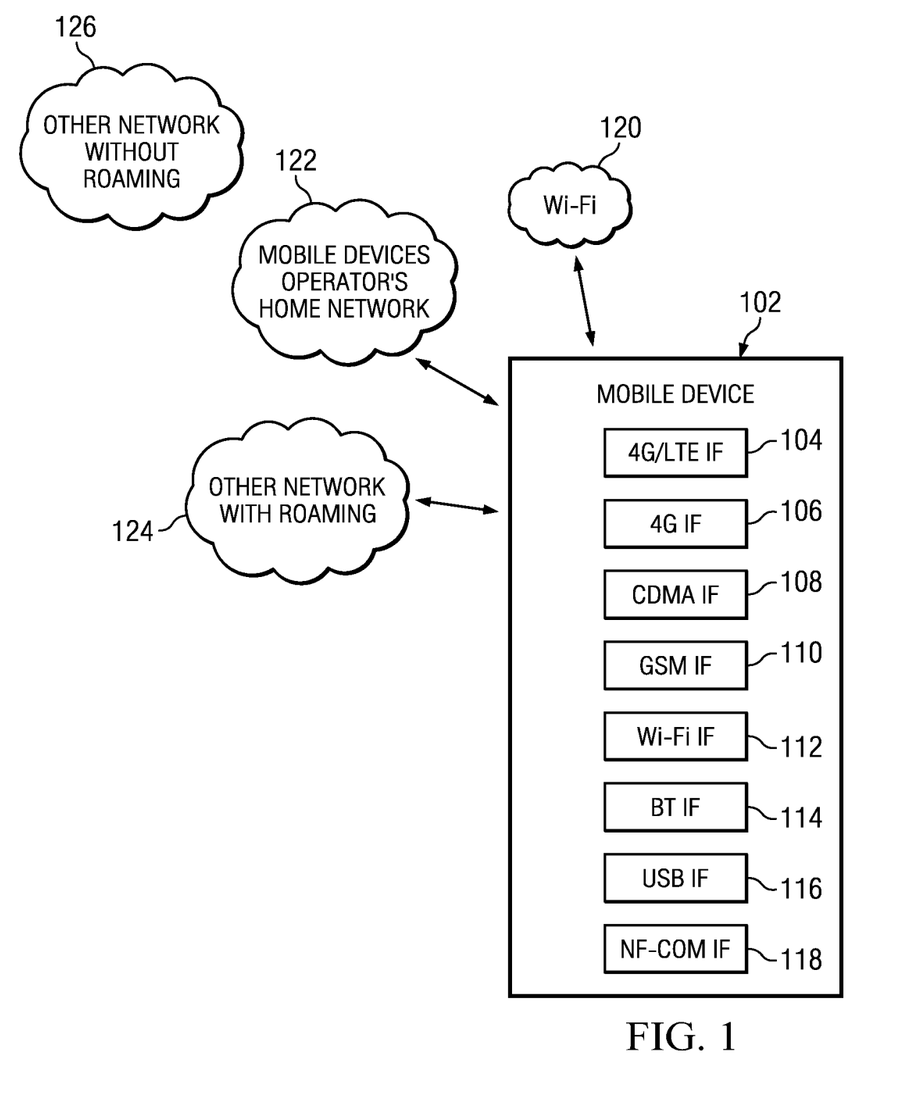
FIG. 1 illustrates a mobile device including a plurality of communication interfaces enabling communications with a variety of externally available networks.

Referring now to the drawings, and more particularly to FIG. 1, there is illustrated a mobile device 102 including a plurality of network communication interfaces enabling the mobile device 102 to communicate with an externally available voice or data network. The mobile device 102 includes a 4G/LTE interface 104 enabling the mobile device 102 to interconnect with a 4G/LTE network. The 4G interface 106 enables interconnection of the mobile device 102 with a 4G network. A CDMA interface 108 enables the mobile device 102 to interconnect with any type of CDMA network, and similarly, the GSM interface 110 enables connection of the mobile device 102 with a GSM network. The Wi-Fi interface 112 enables the mobile device 102 to interconnect with a Wi-Fi network such as those available in various areas around a city. The BT network interface 114 enables the mobile device to interconnect with a BT network. A USB interface 116 enables the mobile device 102 to interconnect with a universal serial bus and any network associated therewith. Finally, the NF-com interface 118 enables the mobile device 102 to connect with an NF network. In this manner, the mobile device 102 interconnects with any number of external networks with which the mobile device has a communication connection.

These networks available to the mobile device can include a Wi-Fi network 120. A Wi-Fi network 120 comprises a wireless local area network based upon IEEE 802.11 standards. The use of the Wi-Fi network 120 by the mobile device does not require a system provider with which the user of the mobile device 102 has a service agreement to utilize any of their system resources in providing a connection to the mobile device. The Wi-Fi network 120 is outside the control of and not provided by the service provider of the mobile device. The mobile device operator's home network 122 comprises the network with which the user of the mobile device 102 has some type of service agreement. This type of network will normally comprise, for example, the 4G/LTE network, 4G network, CDMA network or GSM network. The mobile device's operator's home network 122 is the network with which the mobile device normally achieves a RF connection when the mobile device 102 is located within the home network area of its operator home network. Use of the mobile device operator's home network 122 requires the use of bandwidth and system resources of the mobile device user's system provider.

The mobile device 102 may also communicate with other networks that provide roaming services 124. These other networks that provide roaming include other service providers that provide wireless coverage to areas that the mobile device user may periodically find themselves within but with which they do not have a service agreement. These may also comprise various types of 4G/LTE networks, 4G networks, CDMA networks or GSM networks with which the mobile device 102 may be in communication and require the home network provider of the mobile device subscriber to have some type of roaming agreement in order to provide services to the mobile device 102 while roaming within the other network with roaming services 124.

Finally, other networks that do not provide roaming 126 but use external interfaces that are somehow attached to the mobile device or removable interfaces that may be added to and removed from the mobile device 102. One example would be an Eye-Fi storage card which comprises a memory card providing a Wi-Fi interface different for the Wi-Fi interface of the handset. These types of networks would be accessed when the mobile device was located within areas that provided access to these networks and do not require any type of roaming agreement.

Figure 2:
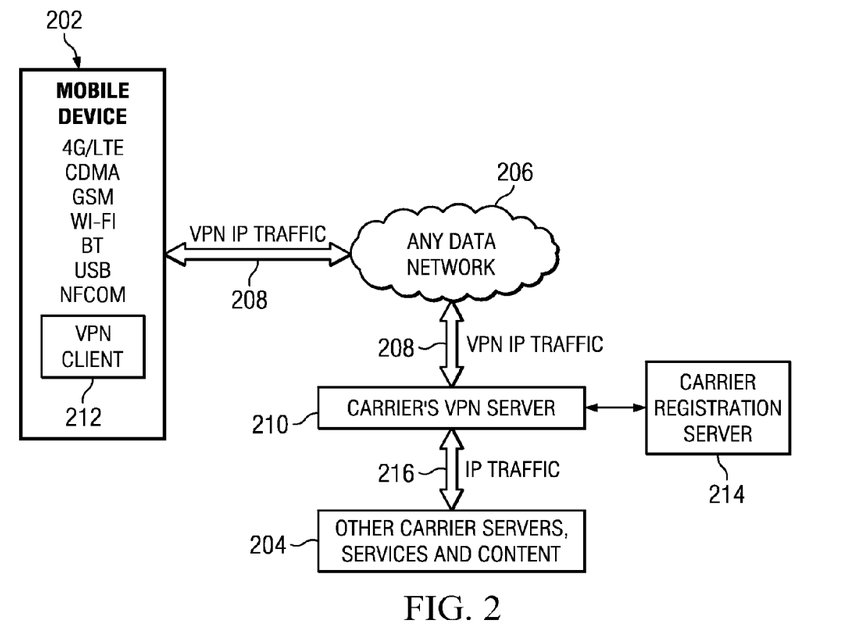
FIG. 2 illustrates the manner in which a mobile device may utilize a virtual private network connection through an available network to access various services and content over the Internet.

Referring now to FIG. 2, there is illustrated the general environment of operation wherein a mobile device 202 may establish a connection with remote service and content providers 204. In existing configurations, the mobile device 202 directly connects to the remote service and content providers 204 through various types of data networks 206. For example, using a Wi-Fi network the mobile device 202 would connect with the Wi-Fi network 206, and the Wi-Fi network would provide a connection over the Internet to the remote service and content provider 204. In this situation, the mobile device 202 would not involve the carrier of the mobile device 202, and the carrier would receive no information concerning the mobile device's connection or the information being reviewed by the mobile device 202.

In the configuration of FIG. 2, the mobile device 202 initially establishes a virtual private network IP traffic connection 208 from the mobile device 202 through the data network 206. This virtual private network connection 208 connects the mobile device 208 to the carrier service provider's VPN server 210. By providing a connection from the mobile device 202 to the carrier's VPN server 210, the carrier is able to obtain information from the mobile device 202.

The establishment of the connection from the mobile device 202 to the carrier's VPN server 210 is controlled by a VPN client 212 located within the mobile device 202. After establishment of the VPN connection 208 between the mobile device 202 and the carrier's VPN server 210 through the data network 206, the carrier's VPN 210 server may register the mobile device 202 with the carrier if the mobile device 202 has not previously registered with the carrier's VPN server 210. This may be accomplished using a carrier registration server 214 that is in communication with the carrier's VPN server 210. If the mobile device 202 has previously registered with the carrier, the carrier's VPN server 210 may establish an IP traffic connection 216 with the service and content remote location 204. The remote services and content provider 204 may provide any type of information that is normally provided over an IP data network 206 to customers such as the purchasing of services, purchasing of products, downloading of materials such as music, media or other types of downloadable content or any other type of services or information which may presently be accessed and/or obtained via the Internet.

By establishing a virtual private network connection 208 between the mobile device 202 and the carrier's VPN server 210, a number of advantages may be achieved by the carrier provider. In one instance, if the data network 206 that is being utilized by the mobile device 202 to contact the carrier's VPN server 210 is, for example, a Wi-Fi network or other type of IP data network that is not controlled and provided by the mobile device service carrier, the carrier is able to provide data services to the mobile device 202 customer without utilizing their own network bandwidth. This will limit the licensing of spectra that is required in order to enable a carrier to provide increased services to a customer through their own network. Additionally, since all service and product requests are being provided through the carrier's VPN server 210, the carrier is able to obtain valuable information concerning a customer's access to various types of goods and services via the Internet. This type of information may be utilized by the carrier for directed marketing campaigns and/or improving and updating the quality of services provided to its customers. If the information had been accessed by the customer solely through a Wi-Fi network without involving a connection to the carrier's VPN server 210, the carrier would never have obtained any information concerning the customer connection.

Further, the VPN client 212 within the mobile device 202 causes the mobile device to periodically store information with respect to the various network interface connections that are provided by the mobile device 202. The mobile device 202 stores this information as will be more fully described herein below and periodically downloads this information to the carrier's VPN server 210 in order to provide valuable network access information to the carrier in order to update and improve their services and networks.

If the data network 206 providing the support for the VPN IP traffic connection 208 between the mobile device 202 and the carrier's VPN server 210 periodically changes during the course of a voice or data transmission, the carrier's VPN server 210 and VPN client 212 may control the connection such that the information is seamlessly passed from one data network 206 to a next data network 206. As described previously, the mobile device may connect to a variety of data networks 206 including 4G/LTE, CDMA, GSM, Wi-Fi, BT, USB, NF-com. The passing from one type of network interface to a second type of network interface can be seamlessly controlled by the carrier's VPN server 210 and the VPN client 212 such that a mobile device 202 continues to receive the data provided from the remote service and content provider 204 without any disruption in the services as seen by the user of the mobile device 202.

Figure 3:
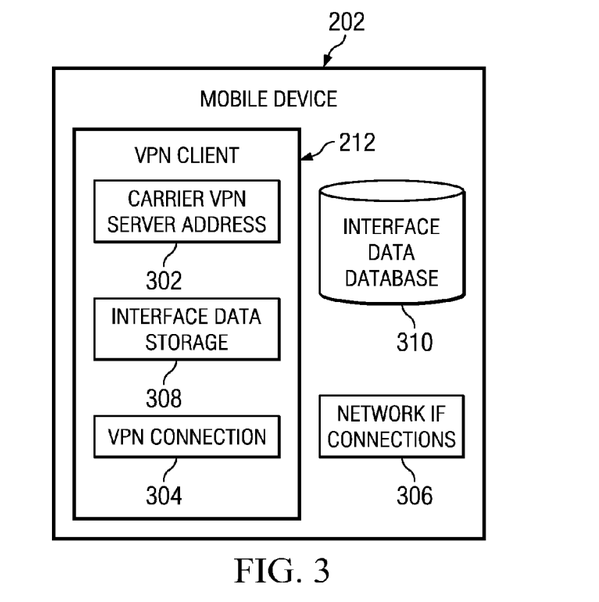
FIG. 3 illustrates the various components within a mobile device enabling creation of the virtual private connection.

Referring now to FIG. 3, there is more fully illustrated the components utilized within the mobile device 202 for establishing the VPN connection to a carrier's VPN server 210 as illustrated in FIG. 2. The VPN client 212, as described previously, causes the mobile device 202 to first establish a connection with the carrier VPN server 210 rather than attempting to directly connect with a remote server 204 from which the mobile device 202 is requesting goods or services. The VPN client 212 comprises application software or firmware. The VPN client 212 checks for any data connection on the mobile device and if no connection is available, the VPN client 212 stores all the interface data using the interface storage module 308 while the device is without its data connection. The VPN client 202 stores a carrier VPN server address 302 in order to enable the mobile device 202 to have a location for establishing an initial contact when requesting products or services. The VPN connection server module 304 utilizes the carrier VPN server address 302 to control the mobile device 202 to establish the initial connection to the carrier's VPN server 204. Thus, upon initially requesting an access to the Internet, the VPN connection module 304 causes the VPN client 212 to control the mobile device 202 to connect with the carrier VPN server 204. The VPN connection 304 controls the various network interface connection 306 depending upon which type of network or networks are available to the mobile device 202. As described previously, the network interface connections 306 comprise connections to any number of data networks including 4G/LTE, CDMA, GSM, Wi-Fi, BT, USB, NF-com, etc.

The interface data storage module 308 monitors the various network interface connections 306 and stores information concerning the connection's signal strength, availability, etc. within an interface data database 310. Using the interface data within the database 310, the VPN client 212 periodically provides the interface data to the provider VPN server 204 and this information may be used for controlling network operations. If the interface data is obtained during an active IP data network connection, the information may be immediately transmitted over an associated network RF connection 306 to the provider server 204. However, if a data connection is not presently available to the mobile device 202, the interface data storage module 308 will store the information within the database 310 until a next IP data connection can be established. The stored network interface data may, in one embodiment, comprise the signal strength from all of the interfaces on the network interface connection 306. The data may also comprise information relating to RF coverage availability for various networks within present locations of the mobile device 202. With respect to Wi-Fi networks, the mobile device 202 may store information relating to the limits of Wi-Fi coverage.

Figure 4:
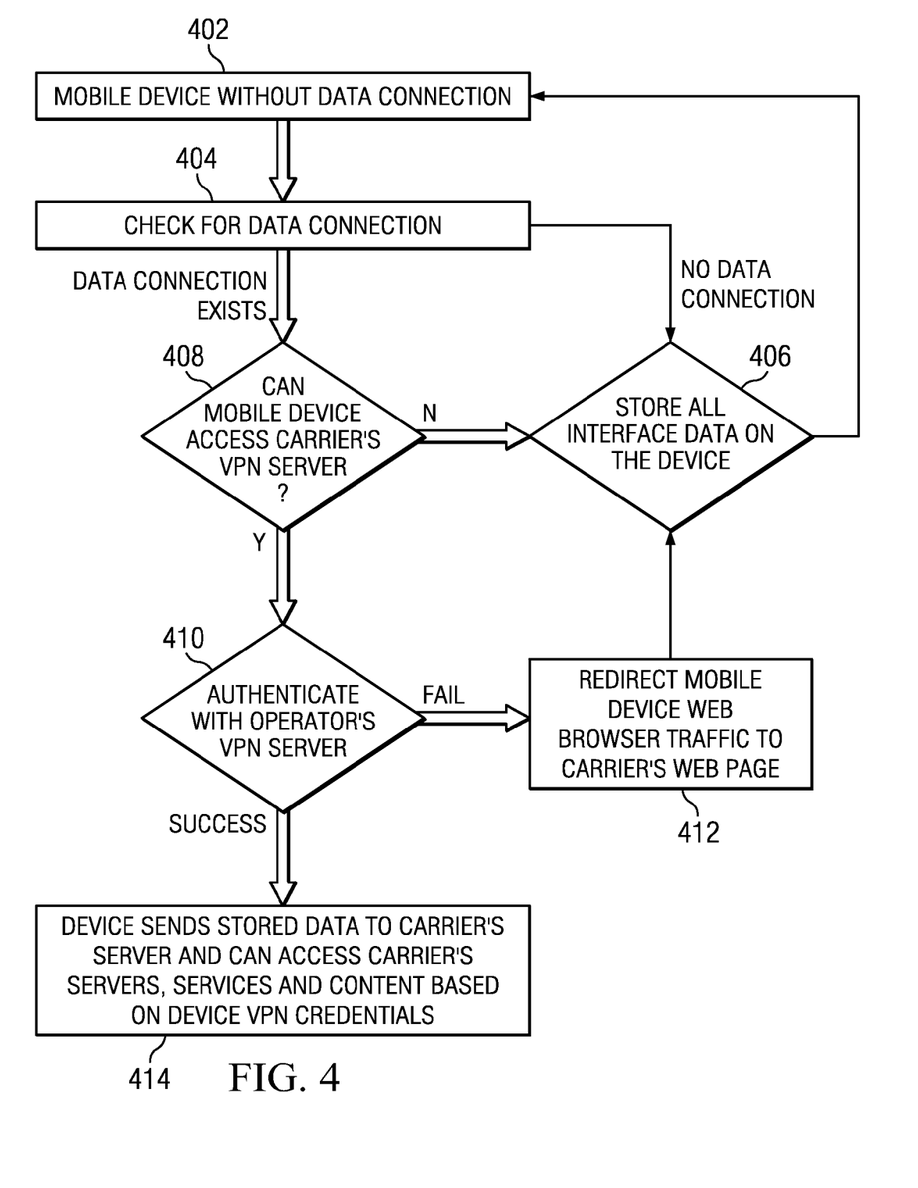
FIG. 4 is flow diagram describing the manner for enabling the mobile device to establish the virtual private connection.

Referring now to FIG. 4, there is illustrated a flow diagram describing the manner by which the mobile device 202 connects with remotely located products and services using the virtual private network IP connection with its carrier. Initially, the mobile device 202 will be without a data connection at step 402. During this time, the information collected by the mobile device 202 will be stored within the interface database 310. The VPN client 212 within the mobile device 202 checks for the existence of a data connection at inquiry step 404. If no data connection is found, the VPN client 212 continues to store all of the interface data within the database 310 at step 406. Control passes back to step 402 when the mobile device is in a no connection state. If a data connection is found at inquiry step 404, the VPN client 212 determines if it can connect with the carrier VPN server 204 at inquiry step 408. If the mobile device cannot establish a connection with the carrier's VPN server 210, the VPN client 212 stores all of the interface data within the database 310 and returns to the no connection state at step 402.

However, if inquiry step 408 determines that the mobile device 202 can access the carrier's VPN server 210, the VPN client 212 attempts to authenticate the mobile device 202 using a VPN authentication process controlled by the VPN connection module 304. If the VPN client 212 fails to provide authentication, the web browser of the mobile device 202 is redirected to the carrier's web registration page at step 412. Within the registration page, the mobile device 202 registers to enable the establishment of a VPN connection with the mobile device 202 and the carrier's VPN server 210. If inquiry step 410 successfully authenticates the mobile device 202, the mobile device is provided with Internet access and the device connects at step 414 to remote services and content based upon the mobile device's VPN credentials. Additionally, at step 414 the interface data storage module 308 within the VPN client 212 causes the mobile device 202 to transmit its stored interface data from the database 310 to the carrier's VPN server 210. Upon obtaining an access grant at step 214, the mobile device 202 has carrier-controlled access to content, sales and other carrier data and multimedia services including, but not limited to, VOIP and multimedia applications as well as other operator-specific applications based upon the mobile device's VPN credentials.

In this manner, all mobile device connections are initially routed through the carrier's VPN server 212. This provides the carrier with invaluable information concerning the user data access interactions and may be used for directed marketing and data mining operations with respect to the user's interest and network uses. Additionally, the carrier is provided with various types of information concerning the network interface connections provided to the mobile device 202. This enables the carrier to analyze the operations of various networks available to and interacting with the mobile device and utilizes the information for improvement of their own network operations or providing this information to third parties to assist them in improving their network operations or provides the service provider a competitive advantage with respect to knowledge of their carrier competitor network capabilities. Additionally, the carrier is able to achieve this benefit without requiring the licensing of additional bandwidth or spectra for use in their own network. The access to the Internet is oftentimes provided by third-party networks such as a Wi-Fi hotspot that does not require the carrier to utilize its own RF network resources.

Figure 5:
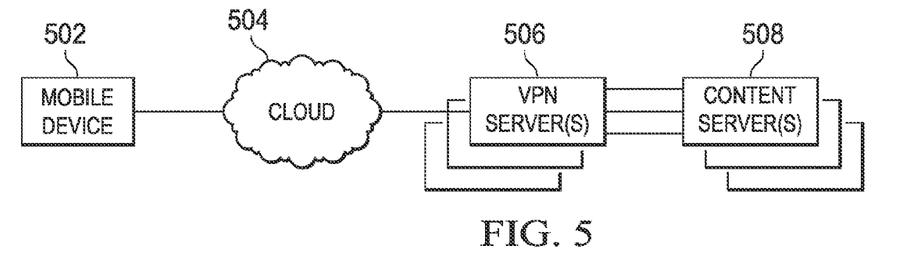
FIG. 5 illustrates another embodiment of the system of FIG. 2.

Referring now to FIG. 5, there is illustrated a further example of the previous embodiment disclosed with respect to FIG. 2. In this case, the mobile device 502 communicates over a data network cloud 504 with one or more virtual private network servers 506 that are under the control of a network carrier provider. The network carrier provider VPN servers 506 provide the virtual private network connection between the VPN server 506 and the mobile device 502 through the data network cloud 504 as described previously. These one or more VPN servers 506 additionally provide connections to one or more content servers 508. The desired information within the content servers 508 is provided back to the mobile device 502 via the VPN server 506 and data network cloud 504.

Figure 6:
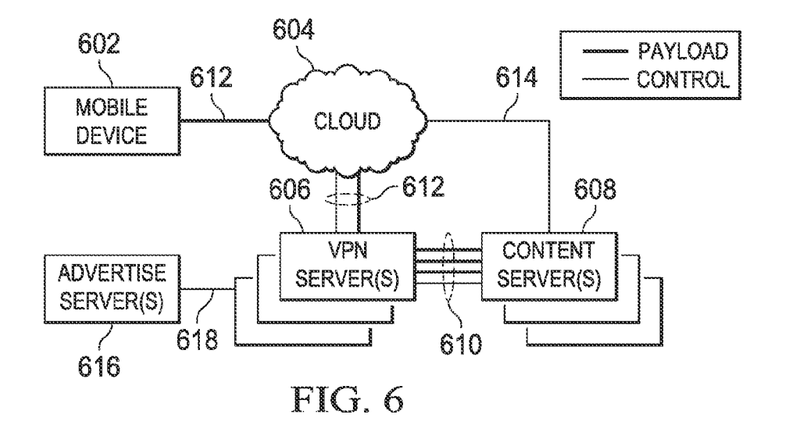
FIG. 6 illustrates the use of a virtual private network to transmit both data content and advertising content.

Referring now to FIG. 6, there is illustrated a further use of the virtual private network. The mobile device 602 establishes a virtual private network connection with one or more VPN servers 606 through the data network cloud 604 as described previously. The VPN server 606 will establish further connections 510 with one or more content servers 508 in order to provide requested information to the mobile device 602.

In the implementation of FIG. 6, the mobile device 602 initially establishes a virtual private network IP traffic connection 612 from the mobile device 602 through the data network cloud 604. The virtual private network connection 612 further connects the mobile device 602 to the carrier service provider's VPN server 606. The establishment of the connection from the mobile device 602 to the carrier's VPN server 606 is initiated by a VPN client within the mobile device 602 as described previously. After establishment of the VPN connection 612 between the mobile device 602 and the VPN server 606 control of the connection is under the VPN server 606. The carrier's one or more VPN servers 606 may register the mobile device 602 with the carrier if the mobile device has not previously registered with the carrier's VPN server 606. If the mobile device 602 has previously registered with the carrier, the carrier's VPN server 606 may establish an IP traffic connection with the content server or servers 608 via one or more communications link 610. The remote services and content server 608 may then provide content information directly back to the mobile device 602 through the data network cloud 604 via connection 614. The content servers 608 may provide any type of information that is normally provided over an IP data network 604 to customers such as the purchasing of services, purchasing of products, downloading a material such as music, media or other types of downloadable content or any other type of services and information that may presently be accessed and/or obtained via an IP data network such as the internet.

In addition to establishing a connection with the content servers 608, the VPN server 606 also establishes connections with one or more advertising servers 616 over a connection or connections 618. The advertising server 616 provides desired advertising content with the content requested from the content server 608. The advertising servers 616 could have the advertising content combined with the content provided from the content servers 608 within the VPN servers 606 or within the VPN client located within the mobile device 602. In this case, the data transmitted from the content servers 608 and the advertising information provided from the advertising server 616 can be provided separately to the mobile device 602 over the data network cloud 604. In implementing the process for including advertising information within content provided from a remote content server 608 as described with respect to FIG. 6, control and implementation of the process may be carried out in a number of different fashions. The various implementations are illustrated in FIGS. 7-10.

Figure 7:
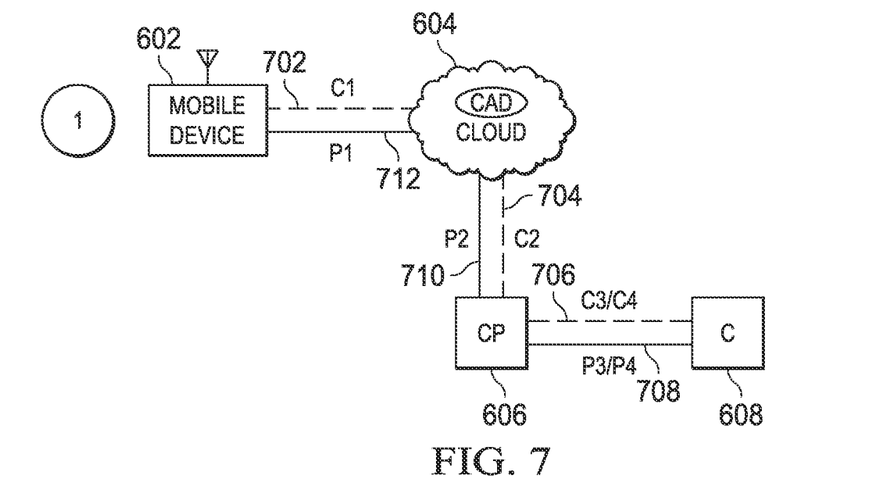
FIGS. 7-10 illustrate various control and payload link implementations for the system of FIG. 6.

Referring now to FIG. 7, there is illustrated a standard connection process between a mobile device 602 and VPN server 606 that only provides content from a remote content provider 608. The mobile terminal 602 initially establishes a first control link 702 from the mobile terminal 602 to a data network cloud 604. A second control link 704 extends from the data network cloud 604 to the VPN server 606. The VPN server 606 establishes a single control link 706 from the virtual private network server 704 to the content server 706. In this case, the content server 608 provides both the remotely located content that is requested by the mobile terminal 602 and the advertising information to be inserted within the content. The combination content data and advertising information is provided back from the content server 608 to the virtual private network server 606 over a pay load link 708. The virtual private network server 606 provides the combination of content and advertising to the data network cloud 604 over pay load link 710 and finally from the data network cloud 604 to the mobile terminal over a pay load link 712.

Figure 8:
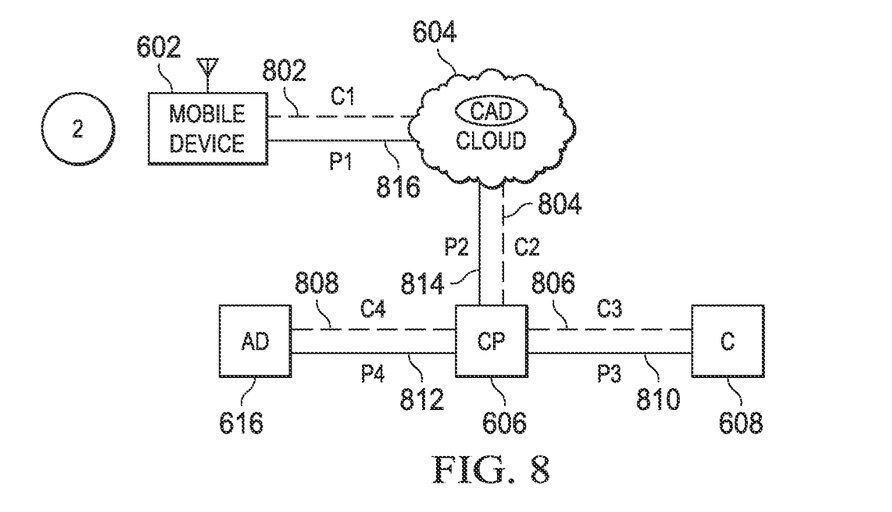

Referring now to FIG. 8, there is illustrated a second embodiment wherein a separate ad server 616 and content provider server 608 exist. The mobile terminal 602 establishes a first control link 802 with the data network cloud 604 and a second control link 804 between the data network clouds 604 and virtual private network controller 606. The network provider's virtual private network server 606 establishes two control links. A first control link 806 is established between the virtual private network server 606 and the content provider server 608. A second control link 808 is established from the virtual private network server 606 to the ad server 616. Responsive to these control connections, the content provider server 608 establishes a pay load link 810 for transmitting requested content data from the content server 608 to the virtual private network server 606. A pay load link 812 is established between the ad server 616 and the virtual private network server 606 for providing the ad information to the virtual private network server 606. The provided content and ad information are combined together within the virtual private network server 606 and provided back to the data network cloud 604 over a pay load link 814. Finally, the combined data content and advertising are provided to the mobile terminal 602 over a pay load link 816 between the mobile terminal 602 and data network cloud 604.

Figure 9:
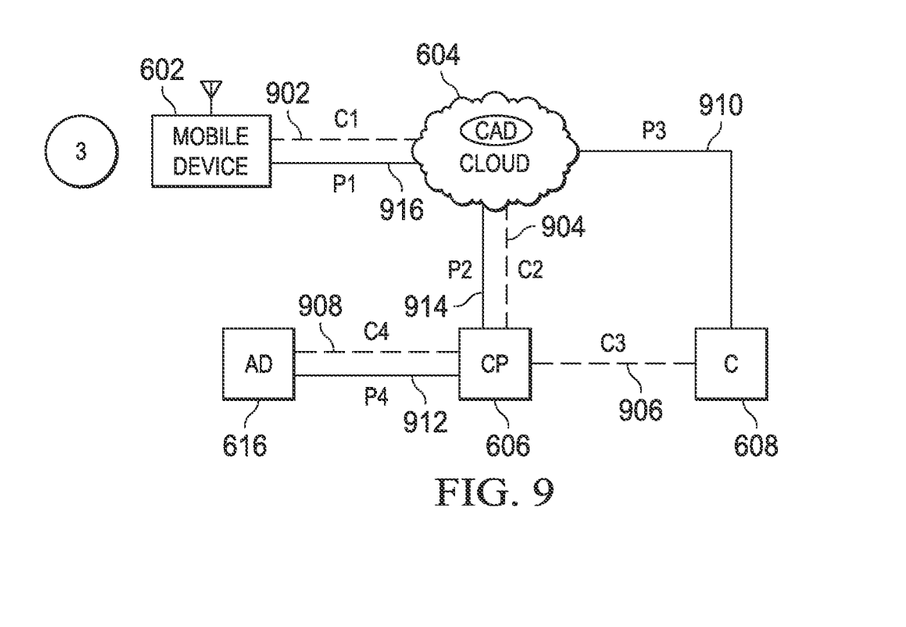

Referring now to FIG. 9, there is illustrated a third embodiment. In this embodiment, the control links are initially established in a manner similar to that discussed with respect to FIG. 8. The mobile terminal 602 establishes a first control link 902 from the mobile terminal 602 to the data network cloud 604. A second control link 904 is established from the data network cloud 604 to the system provider virtual private network server 606. The virtual private network server 606 establishes a first control link 906 to the content server 608 and a second control link 908 to the ad server 616. The content server 608 establishes a pay load link 910 directly from the content provider 608 to the data network cloud 604. A pay load link 912 is established between the virtual private network server 606 and the ad server 616 for providing the ad information to the virtual private network server 606. A pay load link 914 is established with the data network cloud 604 to provide the advertising information from the virtual private network server 606 to the data cloud 604. Finally, both the advertising information and the requested data content are provided from the data network cloud 604 to the mobile terminal 602 over a pay load link 916.

Figure 10:
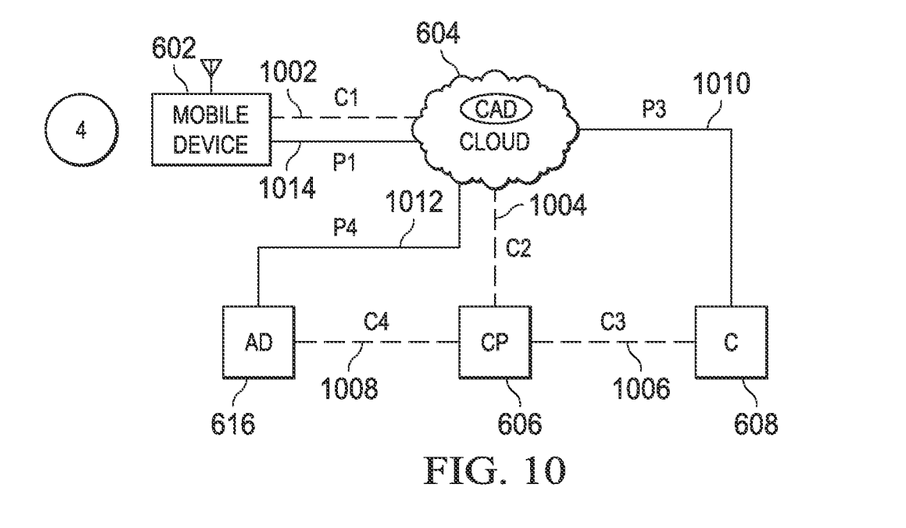

Referring now to FIG. 10, there is illustrated yet another configuration for providing both content and ad information to the mobile terminal under control of the virtual private network server 606. A first control link 1002 is established from the mobile terminal 602 to the data network cloud 604. A second control link 1004 is established between the data network cloud 604 and the virtual private network server 606. The virtual private network 606 establishes a first control link 1006 to a content server 608 and a connection to an ad server 616 over a control link 1008. A first pay load link 1010 is established from the content server 608 back to the data network cloud 604 without going through the virtual private network server 606. Similarly, a pay load link 1012 is established from the ad server 616 to the data network cloud 604 to directly provide the ad information to the data network cloud 604 without going back through the virtual private network server 606. Both the data content and ad content are provided back to the mobile terminal 602 over a pay load link 1014.

It will be appreciated by those skilled in the art having the benefit of this disclosure that this system and method for connecting a mobile device to a global network using a virtual private network connection provides a service provider with a variety of valuable information on a customer's initiation over a network. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for providing access between a remotely located content provider server and a mobile device, comprising:
   establishing a virtual private network connection from the mobile device to a virtual private network server of a service provider associated with the mobile device responsive to a request for access to the remotely located content provider server received from the mobile device;
   establishing under control of the virtual private network server a second connection from the virtual private network server of the service provider to the remotely located content provider server responsive to the request from the mobile device;
   establishing under control of the virtual private network server a third connection from the virtual private network server of the service provider to an advertising server responsive to the request from the mobile device;
   maintaining under control of the virtual private network server the virtual private network connection, the second connection and the third connection to enable transport of content data between the mobile device and the remotely located content provider server and to enable transport of advertising data between the mobile device and the advertising server;
   transporting the content data from the remotely located content provider server to the mobile device over the second connection and the virtual private network connection; and
   transporting the advertising data from the advertising server to the mobile device over the third connection and the virtual private network connection concurrently with the content data.

2. The method of claim 1, wherein the step of establishing the virtual private network connection further comprises:
   receiving a request from the mobile device to access the content data at a web address associated with the remotely located content provider server; and
   directing the request to the virtual private network server of the service provider.

3. The method of claim 1 further including the step of establishing a fourth connection from the remotely located content provider server to the mobile device.

4. The method of claim 3, wherein the step of maintaining further comprises the step of maintaining under control of the virtual private network server the virtual private network connection, the second connection, the third connection and the fourth connection to enable transport of the content data between the mobile device and the remotely located content provider server and to enable transport of the advertising data between the mobile device and the advertising server.

5. The method of claim 4, wherein the step of maintaining further includes the steps of:
   transporting the content data from the remotely located content provider server to the mobile device over the fourth connection; and
   transporting the advertising data from the advertising server to the mobile device over the third connection and the virtual private network connection.

6. The method of claim 1 further including the steps of:
   establishing a fourth connection from the remotely located content provider server to the mobile device; and
   establishing a fifth connection from the advertising server to the mobile device.

7. The method of claim 6, wherein the step of maintaining further comprises the step of maintaining under control of the virtual private network server the virtual private network connection, the second connection, the third connection, the fourth connection and the fifth connection to enable transport of the content data between the mobile device and the remotely located content provider server and to enable transport of the advertising data between the mobile device and the advertising server.

8. The method of claim 7, wherein the step of maintaining further includes the steps of:
   transporting the content data from the remotely located content provider server to the mobile device over the fourth connection; and
   transporting the advertising data from the advertising server to the mobile device over the fifth connection.

9. A method for providing access between a remotely located content provider server and a mobile device, comprising:
   establishing a virtual private network connection from the mobile device to a virtual private network server of a service provider associated with the mobile device responsive to a request for access to the remotely located content provider received from the mobile device;
   establishing under control of the virtual private network server a second connection from the virtual private network server of the service provider to the remotely located content provider server responsive to the request from the mobile device;
   establishing under control of the virtual private network server a third connection from the virtual private network server of the service provider to an advertising server responsive to the request from the mobile device;
   establishing a fourth connection from the remotely located content provider server to the mobile device responsive to the request from the mobile device without the fourth connection passing through the virtual private network server;
   maintaining under control of the virtual private network server the virtual private network connection, the second connection, the third connection and the fourth connection to enable transport of content data between the mobile device and the remotely located content provider server and to enable transport of advertising data between the mobile device and the advertising server;
   transporting the content data from the remotely located content provider server to the mobile device over the fourth connection without transporting the content data through the virtual private network server; and
   transporting the advertising data from the advertising server to the mobile device over the third connection and the virtual private network connection concurrently with the content data.

10. The method of claim 9, wherein the step of establishing the virtual private network connection further comprises:
    receiving a request through the mobile device to access the content data at a web address associated with the remotely located content provider server; and
    directing the request to the virtual private network server of the service provider.

11. The method of claim 9 further including the step of establishing a fifth connection from the advertising server to the mobile device.

12. The method of claim 11, wherein the step of maintaining further comprises the step of maintaining under control of the virtual private network server the virtual private network connection, the second connection, the third connection, the fourth connection and the fifth connection to enable transport of the content data between the mobile device and the remotely located content provider server and to enable transport of the advertising data between the mobile device and the advertising server.

13. The method of claim 12, wherein the step of maintaining further includes the steps of:
    transporting the content data from the remotely located content provider server to the mobile device over the fourth connection; and
    transporting the advertising data from the advertising server to the mobile device over the fifth connection.

14. A method for providing access between a remotely located content provider server and a mobile device, comprising:
    establishing a virtual private network connection from the mobile device to a virtual private network server of a service provider associated with the mobile device responsive to a request for access to the remotely located content provider received from the mobile device;
    establishing under control of the virtual private network server a second connection from the virtual private network server of the service provider to the remotely located content provider server responsive to the request from the mobile device;
    establishing under control of the virtual private network server a third connection from the virtual private network server of the service provider to an advertising server responsive to the request from the mobile device;
    establishing a fourth connection from the remotely located content provider server to the mobile device responsive to the request from the mobile device without transporting the data content through the virtual private network server;
    establishing a fifth connection from the advertising server to the mobile device responsive to the request from the mobile device without transporting the data content through the virtual private network server;
    maintaining under control of the virtual private network server the virtual private network connection, the second connection, the third connection, the fourth connection and the fifth connection to enable transport of content data between the mobile device and the remotely located content provider server and to enable transport of advertising data between the mobile device and the advertising server;
    transporting the content concurrently with the advertising data without transporting the content data through the virtual private network server data from the remotely located content provider server to the mobile device over the fourth connection; and
    transporting the advertising data from the advertising server to the mobile device over the fifth connection concurrently with the content data without transporting the advertising data through the virtual private network server.

15. The method of claim 14, wherein the step of establishing the virtual private network connection further comprises:
    receiving a request through the mobile device to access the content data at a web address associated with the remotely located content provider server; and
    directing the request to the virtual private network server of the service provider.

16. A system for providing access between a remotely located content provider server and a mobile device, comprising:
    a wireless service provider virtual private network server for providing a virtual private network for receiving a request for access to the remotely located content provider and establishing a virtual private network connection from the mobile device to the wireless service provider virtual private network server responsive to the request for access to the remotely located content provider received from the mobile device;

wherein the wireless service provider virtual private network server further establishes and controls a second connection from the wireless service provider virtual private network server to the remotely located content provider server responsive to the request from the mobile device, a third connection from a wireless service provider virtual private network server to an advertising server responsive to the request from the mobile device, a fourth connection from the remotely located content provider server to the mobile device and a fifth connection from the advertising server to the mobile device;

wherein the wireless service provider virtual private network server further maintains and controls the virtual private network connection, the second connection the third connection, the fourth connection and the fifth connection to enable a concurrent transport of content data between the mobile device and the remotely located content provider server and advertising data from the advertising server to the mobile device; and wherein the remotely located content provider server transports the content data from the remotely located content provider server to the mobile device over the fourth connection without passing the content data through the wireless service provider virtual private network server, and further wherein the wireless service provider virtual private network server transports the advertising data from the advertising server to the mobile device over the fifth connection without passing the advertising data through the wireless service provider virtual private network server.

17. The system of claim 16, wherein the private server further authenticates the mobile device responsive to the request and establishes the virtual private network connection between the mobile device and the virtual private network server responsive to a valid authentication.

18. The system of claim 16:
   wherein the remotely located content provider server establishes a fourth connection from the remotely located content provider server to the mobile device; and
   wherein the advertising server establishes a fifth connection from the advertising server to the mobile device.

19. The system of claim 18, wherein the private server maintains the virtual private network server the virtual private network connection, the second connection, the third connection, the fourth connection and the fifth connection to enable transport of content data between the mobile device and the remotely located content provider server and to enable transport of advertising data between the mobile device and the advertising server.

* * * * *